(12) United States Patent
Krone et al.

(10) Patent No.: US 11,595,618 B2
(45) Date of Patent: Feb. 28, 2023

(54) ENHANCED VISIBILITY SYSTEM FOR WORK MACHINES

(71) Applicant: Caterpillar Inc., Peoria, IL (US)

(72) Inventors: Bradley P. Krone, Dunlap, IL (US); Joseph L. Faivre, Edelstein, IL (US); Michael W. Bridenbaugh, Chillicothe, IL (US); Brad R. Van De Veer, Washington, IL (US); Shastri Ram, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 114 days.

(21) Appl. No.: 16/842,164

(22) Filed: Apr. 7, 2020

(65) Prior Publication Data

US 2021/0314528 A1 Oct. 7, 2021

(51) Int. Cl.
| | | |
|---|---|---|
| *H04N 7/18* | (2006.01) | |
| *G06T 11/00* | (2006.01) | |
| *B60R 1/00* | (2022.01) | |
| *E02F 9/26* | (2006.01) | |
| *B64D 47/08* | (2006.01) | |
| *B64C 39/02* | (2023.01) | |
| *G05D 1/02* | (2020.01) | |
| *E02F 3/76* | (2006.01) | |

(52) U.S. Cl.
CPC ............... *H04N 7/181* (2013.01); *B60R 1/00* (2013.01); *B64C 39/024* (2013.01); *B64D 47/08* (2013.01); *E02F 9/261* (2013.01); *G06T 11/00* (2013.01); *B60R 2300/10* (2013.01); *B60R 2300/20* (2013.01); *B60R 2300/50* (2013.01); *B64C 2201/123* (2013.01); *E02F 3/7609* (2013.01); *G05D 1/0202* (2013.01); *G05D 2201/0207* (2013.01); *G06T 2210/61* (2013.01)

(58) Field of Classification Search
CPC ...... H04N 7/181; B64C 39/024; B64D 47/08; E02F 9/26
See application file for complete search history.

(56) References Cited

U.S. PATENT DOCUMENTS

| | | | |
|---|---|---|---|
| 9,294,736 B2 | 3/2016 | Tanuki et al. | |
| 9,685,009 B2 | 6/2017 | Sprock et al. | |
| 9,824,490 B1* | 11/2017 | Cote | E02F 9/261 |
| 10,066,367 B1* | 9/2018 | Wang | E02F 9/265 |
| 10,165,722 B2 | 1/2019 | Ackerman et al. | |
| 2016/0076223 A1* | 3/2016 | Wei | E02F 3/435 |
| | | | 701/50 |
| 2016/0148421 A1 | 5/2016 | Friend | |
| 2018/0141658 A1 | 5/2018 | Baur | |

(Continued)

*Primary Examiner* — Jeremiah C Hallenbeck-Huber
(74) *Attorney, Agent, or Firm* — Schwegman Lundberg & Woessner

(57) ABSTRACT

An enhanced visibility system for a work machine includes an image capture device, a sensor, one or more control circuits, and a display. The image capture device is configured to obtain image data of an area surrounding the work machine. The sensor is configured to obtain data regarding physical properties of the area surrounding the work machine. The control circuits are configured to receive the image data and the data regarding the physical properties, and augment the image data with the data regarding the physical properties to generate augmented image data. The display is configured to display the augmented image data to provide an enhanced view of the area surrounding the work machine.

20 Claims, 5 Drawing Sheets

(56) References Cited

U.S. PATENT DOCUMENTS

| | | | |
|---|---|---|---|
| 2018/0282970 A1 | 10/2018 | Koga et al. | |
| 2019/0039862 A1 | 2/2019 | Palberg et al. | |
| 2019/0178081 A1 | 6/2019 | Mäder | |
| 2019/0351944 A1* | 11/2019 | Singh | F16H 39/02 |
| 2020/0063401 A1* | 2/2020 | Sherlock | E02F 9/2045 |
| 2020/0093053 A1* | 3/2020 | Ehlert | A01B 79/005 |
| 2020/0117201 A1* | 4/2020 | Oetken | G06K 9/0063 |
| 2020/0218286 A1* | 7/2020 | Tamasato | G06K 9/0063 |
| 2020/0221632 A1* | 7/2020 | Strnad | G01N 33/246 |
| 2020/0242829 A1* | 7/2020 | Cheng | E02F 9/262 |
| 2020/0277758 A1* | 9/2020 | Edamura | E02F 9/2296 |
| 2021/0034867 A1* | 2/2021 | Ferrari | G05D 1/0236 |
| 2021/0062473 A1* | 3/2021 | Ding | G09G 5/377 |
| 2021/0131072 A1* | 5/2021 | Gratton | G07C 5/0808 |
| 2021/0214922 A1* | 7/2021 | Yamashita | H04N 13/275 |

\* cited by examiner

ENHANCED VISIBILITY SYSTEM FOR WORK MACHINES

TECHNICAL FIELD

The present application relates generally to work machines. More particularly, the present application relates to enhanced visual displays for operators of work machines.

BACKGROUND

Work machines, such as dozers, for example, are used for a variety of tasks requiring operator control of the work machine and various implements associated with the machine. This control may be performed by an operator physically on the machine, or remote from the machine using one or more remote devices. These machines can be large and complex, increasing the desirability to know the surroundings of the machine when providing control.

U.S. 2018/0141658A1 A1 describes a driver assistance system for an automobile that employs an aerial camera.

SUMMARY

In one example, an enhanced visibility system for a work machine includes an image capture device, a sensor, one or more control circuits, and a display. The image capture device is configured to obtain image data of an area surrounding the work machine. The sensor is configured to obtain data regarding physical properties of the area surrounding the work machine. The control circuits are configured to receive the image data and the data regarding the physical properties, and augment the image data with the data regarding the physical properties to generate augmented image data. The display is configured to display the augmented image data to provide an enhanced view of the area surrounding the work machine.

In another example, a method for providing an enhanced visibility display for an operator of a work machine includes capturing, via an image capture device, image data of an area surrounding the work machine; sensing data regarding physical properties of the area surrounding the work machine; receiving, via one or more control circuits, the image data and the data regarding the physical properties; augmenting the image data with the data regarding the physical properties to generate augmented image data; and displaying the augmented image data to provide an enhanced view of the area surrounding the work machine to the operator.

In another example, a system for a remotely controlled work machine includes an image capture device, a sensor, a control circuit, and a display. The image capture device is configured to obtain image data of an area adjacent the remotely controlled work machine. The sensor is configured to obtain data regarding physical properties of the area adjacent the remotely controlled work machine. The control circuit is configured to receive the image data and the data regarding the physical properties, and augment the image data with the data regarding the physical properties to generate augmented image data. The display is positioned on a remote computing device and configured to display the augmented image data to provide an enhanced view of the area adjacent the remotely controlled work machine to an operator of the remotely controlled work machine.

DETAILED DESCRIPTION

Figure 1:
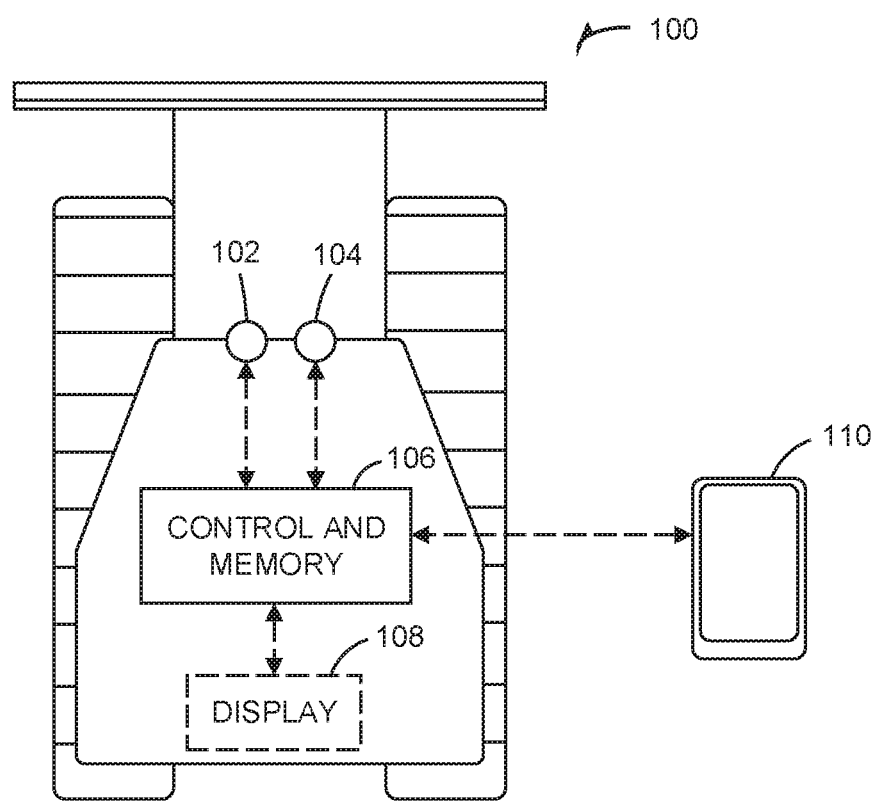
FIG. 1 is a diagram illustrating a work machine that includes sensors for obtaining data to provide an enhanced visual display to an operator.

FIG. 1 is a diagram illustrating a work machine 100 that includes sensors 102 and 104 for obtaining data to provide an enhanced visual display to an operator. While labeled as sensors, the sensors 102 and 104 may be any components, devices, or assemblies that include one or more sensors. The work machine 100 is illustrated as a dozer in FIG. 1, but can be any other work machine such as a compactor, mixer, scraper, motor grader, excavator, material hauler, and the like. The work machine 100 includes the sensors 102 and 104, a control and memory circuit 106, and an optional display 108. While illustrated as positioned on a forward portion of the work machine 100, the sensors 102 and 104 may be positioned at any other location on the work machine 100.

In some examples, the work machine 100 may be controllable by an operator physically located on the work machine 100. In these examples, the display 108 may be used to provide enhanced views of a surrounding or adjacent area to the operator on the work machine 100. In other examples, the work machine 100 may be remotely operated using one or more systems, such as the remote computing device 110 illustrated in FIG. 1. The remote computing device 110 may include a display, one or more input/output devices, control and memory circuits, and any other components. In some examples, the display may include input/output functionality such as a touchscreen display.

The control and memory circuit 106 can include, for example, software, hardware, and combinations of hardware and software configured to execute several functions related to control of the work machine 100 and the enhanced images provided to the display 108 and/or remote computing device 110. The control and memory circuit 106 can be an analog, digital, or combination analog and digital controller including a number of components. As examples, the control and memory circuit 106 can include integrated circuit boards or ICB(s), printed circuit boards PCB(s), processor(s), data storage devices, switches, relays, or any other components. Examples of processors can include any one or more of a microprocessor, a controller, a digital signal processor (DSP), an application specific integrated circuit (ASIC), a field-programmable gate array (FPGA), a graphics processing unit (GPU), or equivalent discrete or integrated logic circuitry.

The control and memory circuit 106 may include storage media to store and/or retrieve data or other information such as, for example, input data from the sensors 102 and 104. Storage devices, in some examples, are described as a computer-readable storage medium. The data storage devices can be used to store program instructions for execution by processor(s) of control and memory circuit 106, for example. The storage devices, for example, are used by software, applications, algorithms, as examples, running on and/or executed by control and memory circuit 106. The storage devices can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random-access memories (DRAM), static random-access memories (SRAM), and other forms of volatile memories known in the art.

One or both of the sensors 102 and 104 may be optical image sensors or devices that include optical image sensors, for example. The image sensors may be digital imagers, or other analog or digital devices configured to convert received light into electronic signals, and may be incorporated into one or more image capture devices, such as cameras, for example. The image capture devices may be configured to provide still images, video feeds, or the like, for one or more areas surrounding or adjacent the work machine 100. For example, one or both of the sensors 102 and 104 may be incorporated in a camera and may be image sensors for capturing video including, but not limited to, a semiconductor charge-coupled devices (CCD) type sensor, a complementary metal-oxide-semiconductor (CMOS) type sensor, an N-type metal-oxide-semiconductor (NMOS) type sensor, or other any type of image sensor or combinations thereof. The area surrounding the machine may be a rear view, a forward view, a side view, or a view of any other area surrounding or adjacent the work machine 100.

One or both of the sensors 102 and 104 may be another type of sensor or device that includes another type of sensor, such as Light Detection and Ranging (lidar), radar, a thermal imager, a load sensor, an ultrasonic sensor, or the like, configured to collect data regarding physical properties of the area surrounding or adjacent the machine 100. For example, a lidar sensor emits laser light and measures properties of the returning laser light to obtain data indicative of physical properties of an area. These physical properties may include data regarding terrain, obstacles, and the like. Similarly, a radar device emits radio waves and measures properties of the reflected radio waves to sense similar properties of an area. These and other types of sensors or devices may be used to sense properties of an area surrounding the work machine 100 that a camera or other image capture device is unable to obtain.

Figure 2:
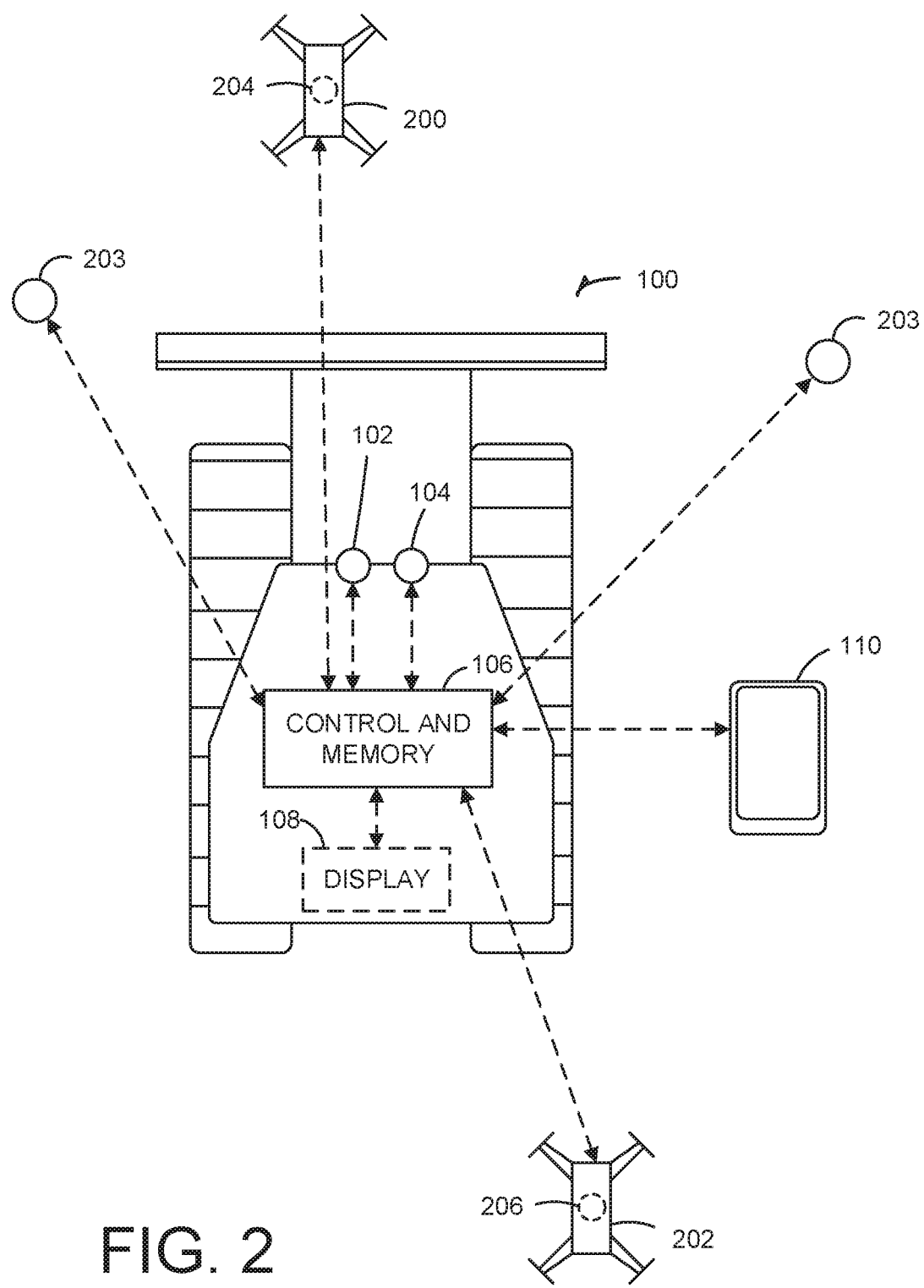
FIG. 2 is a diagram illustrating a system that includes a work machine and aerial devices for obtaining data to provide an enhanced visual display to an operator.

FIG. 2 is a diagram illustrating a system that includes the work machine 100, aerial devices 200 and 202, and static sensors 203 for obtaining data to provide an enhanced visual display to an operator. The aerial devices 200 and 202 may be any type of unmanned aerial device (UAV) such as drone, for example. Each aerial device 200 and 202 includes a respective sensor (or device including a sensor) 204 and 206 positioned on the aerial device 200 and 202. Each sensor 204 and 206 may be optical image sensors (or image capture devices such as cameras), for example. The image sensors may be digital imagers, or other analog or digital devices configured to convert received light into electronic signals, and may be incorporated into one or more image capture devices, such as cameras, for example. The image capture devices may be configured to provide still images, video feeds, or the like. The sensors 204 and 206 may also be another type of sensor or device, such as lidar, radar, ultrasonic sensor, thermal imager, or the like, configured to collect data regarding the area around the machine 100. While illustrated as two aerial devices 200 and 202, each having a single respective sensor 204 and 206, the system may include any number of aerial devices each having any number of sensors.

The aerial devices 200 and 202 may include control and memory circuits and a wireless communication interface, for example. The wireless communication interface may be used to communicate data with one or more of the control and memory circuit 106 and the remote computing device 110. The wireless communication interface may also be used to receive data, such as control instructions, from the control and memory circuit 106 and the remote computing device 110. In another example, one or more of the aerial devices 200 and 202 may be tethered or otherwise connected to work machine 100 through a wired connection. In this example, the respective aerial device may communicate with and/or receive power from, the work machine 100 over the wired connection.

An operator of the work machine 100 may wish to observe a specific area in the vicinity of the work machine 100, for example, and may manually control the aerial devices 200 and 202 to obtain image or other data regarding the respective area. In another example, the control and memory circuit 106 or the remote computing device 110 may automatically control the aerial devices 200 and 202 based on a current position of the work machine 100. For example, the aerial device 200 may be automatically controlled to stay a predetermined distance in front of the work machine 100 and the aerial device 202 may be controlled to stay a predetermined distance behind the work machine 100 such that image or other data can continuously be obtained for both the forward and rearward areas around the work machine 100.

The static sensors 203 may be positioned to obtain data relevant to the operation of the work machine 100. In an example, the static sensors 203 may be one or more site sensors positioned in static locations to obtain data regarding a respective worksite. The static sensors 203 may be optical image sensors or devices that include optical image sensors, for example. The static sensors 203 may also be another type of sensor or device that includes another type of sensor, such as lidar, radar, ultrasonic sensors, thermal imagers, load sensors, or the like, configured to collect data regarding physical properties of the area. While illustrated as two static sensors 203, any number of static sensors or devices may be used to obtain data regarding an area associated with the work machine 100.

Any combination of sensors or devices may be used between the work machine 100, the aerial devices 200 and 202, and the static sensors 203. For example, the work machine 100 may include one or more image capture devices and the aerial devices 200 and 202 may include one or more of lidar devices, thermal imagers, ultrasonic sensors, radar devices, and the like. In another example, the work machine 100 and the aerial devices 200 and 202 may each include both an image capture device and another type of sensor, such as a lidar device. In another example, the work machine 100 may include non-image data type sensors such as load sensors, for example, while the aerial devices 200 and 202 and the static sensors 203 include image capture devices, such as cameras.

Figure 3:
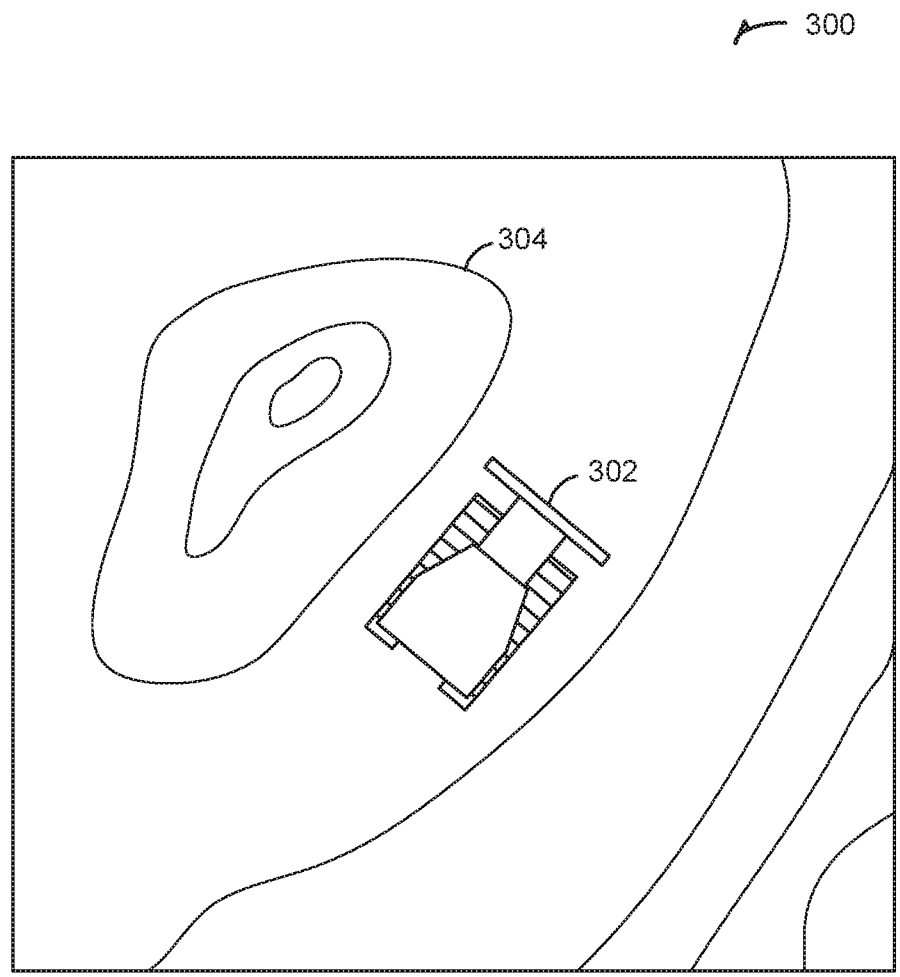
FIGS. 3 and 4 are diagrams illustrating example enhanced displays provided to an operator of a work machine.
Figure 4:
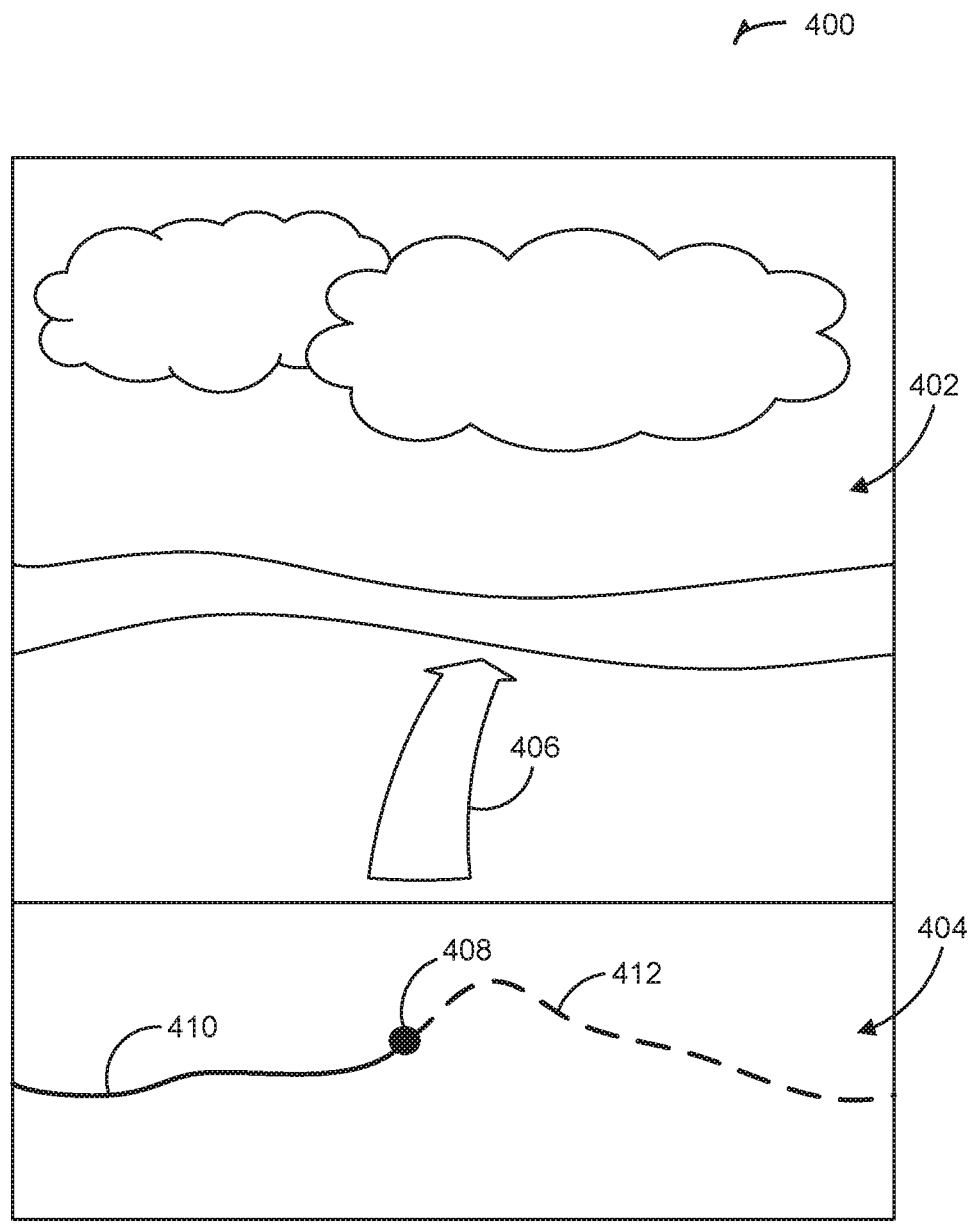

The data from the image capture devices may be augmented with the data from the non-image sensors to provide an enhanced display to an operator of the work machine 100. FIGS. 3 and 4 are diagrams illustrating example enhanced displays 300 and 400, respectively, that may be produced by augmenting image data with other data collected by the sensors 102, 104, 203, 204, and 206. In some examples, the image data may also or alternatively be augmented using pre-collected data. For example, a worksite may be surveyed prior to operation of the work machine 100 to obtain pre-collected data, and the pre-collected data may then be use to augment the image data. The pre-collected data may be obtained using one or more sensors, for example, such as the sensors 203, 204, and 206, and/or other sensors, or using other data collection methods.

The enhanced display 300 illustrates an overhead view of the work machine 100 as a displayed work machine 302. The overhead view may include actual image data which may have been captured by image capture devices on the work machine 100, by the static sensors 203, and/or by aerial devices 200 and 202. The display 300 also illustrates topographical data, such as topographical lines 304. This may be much more sensitive topographical data than is found in typical topographical maps. For example, lidar sensors on the work machine 100, the aerial devices 200 and 202, and/or the static sensors 203 may be used to obtain very specific topographical data for the area surrounding the work machine 100, which may be desirable for certain types of construction jobs, for example. This data may be collected in real-time during operation of the work machine 100, or prior to operation of the work machine 100. While described as an overhead view, other views may be generated that include topographical data. For example, forward or rearward views for the work machine 100 may be generated with topographical information overlaid on the surfaces forward and rearward of the work machine 100.

The display 400 includes sub-displays 402 and 404. The sub-display 402 illustrates image data for a view of the area in front of the work machine 100. This image data may be obtained by an image capture device on the work machine 100, on one of the aerial devices 200 and 202, and/or the static sensors 203. The sub-display 402 may be augmented with a directional indicator 406 indicating a path for an operator of the machine 100 to follow. This indicator 406 may be generated by the control and memory circuit 106, the remote computing device 110, or another computing system based on a predetermined route or a route determined using data sensed by one or more of the sensors 102, 104, 203, 204, and/or 206. For example, a radar sensor may be used to detect one or more markers, such as trees or other geographic objects. The control and memory circuit 106, for example, may use these detected markers to confirm or adjust a route and update the indicator 406 accordingly.

Figure 5:
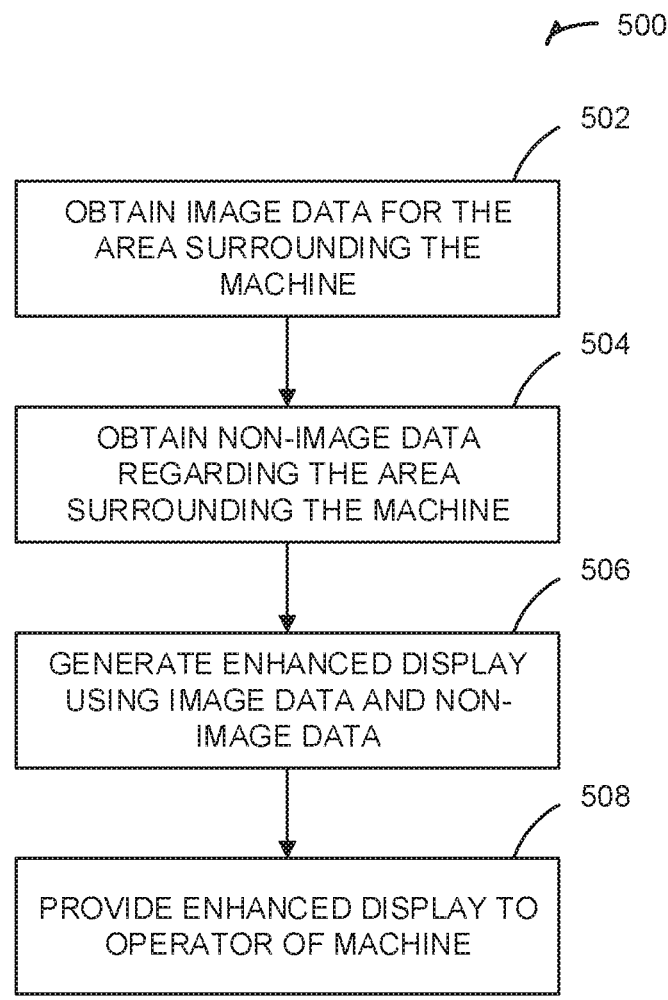
FIG. 5 is a flowchart illustrating a method for providing an enhanced display for an operator of a work machine.

The sub-display 404 illustrates an example load profile for the machine 100. The load profile may include a current load 408, a past load profile 410, and a predicted load profile 412. The current load 408 may be determined using a load sensor as one of the sensors 102 or 104 positioned on the machine 100 such as on a dozer blade, for example. The predicted load profile 412 may be generated by the control and memory circuit 106, for example, using a predetermined or predicted route of the work machine 100 (such as the route indicated by the indicator 406). While illustrated as two types of enhanced displays 300 and 400, any other enhanced displays may be generated using the sensor data from the sensors 102, 104, 203, 204, 206, and/or any other sensors. For example, a thermal imager may be used to augment image data with thermal data to better detect living objects FIG. 5 is a flowchart illustrating a method 500 for providing an enhanced display for an operator of a work machine. At step 502, image data is obtained using one or more image capture devices for a work machine. The image capture devices may be positioned on the work machine, on one or more aerial devices in communication with the work machine and/or the remote computing device 110, and/or in a separate static location. At step 504, non-image data (such as physical property data) regarding the surrounding area is obtained. This may be accomplished using one or more sensors that collect data that is not optical in nature. For example, these sensors may include lidar sensors, radar sensors, load sensors, thermal sensors, and the like. The non-image data may also be generated data based on sensed data. For example, non-image data may include a projected route of the machine based on data obtained by one or more lidar sensors.

At step 506, the image data is augmented using the non-image data to generate one or more enhanced displays, such as the example displays 300 and 400. The enhanced display may be provided to an operator physically located on the work machine, or remotely controlling the work machine through one or more remote computing devices. The display may include image and/or video data to the operator of one or more areas surrounding the machine, and also non-image data to provide further data to the operator regarding the work machine and/or the surrounding area. For example, the display may be video data with topographical data overlaid, video data with related load data for an implement of the work machine, projected route data, and the like. At step 508, the enhanced display is provided to an operator of the machine. This display may be provided to an operator positioned on the machine, or to an operator controlling the machine remotely, such as through a remote computing device. This is advantageous in that it provides an operator with improved data regarding areas surrounding the machine, improving the efficiency and efficacy of the control of the work machine, and improving the safety of personnel around the work machine.

INDUSTRIAL APPLICABILITY

In one illustrative example, the work machine is a Caterpillar remotely controllable dozer that includes at least one camera and a lidar sensor mounted to the dozer. An operator is able to control the dozer through a remote control console that is in communication with the dozer. A drone is utilized to obtain further image data and is able to wirelessly communicate with the dozer and/or the remote control console. The drone may include an extra camera, an extra lidar sensor, or any other sensor capable of sensing data indicative of the area around the dozer.

The camera(s) and other sensors provide data to a control circuit that may be physically located on the dozer, the drone, or the remote control console. The control circuit receives the data and generates one or more enhanced views for display to the operator of the dozer. For example, the remote control console may have a display for outputting the enhanced view to the operator of the dozer. In an example, the enhanced view is a 360° view around the dozer that also illustrates the terrain around the dozer. For example, lidar sensors may be able to obtain data regarding the terrain around the dozer, allowing the data from the lidar sensors to be added to the image data from the cameras to provide the enhanced view to the operator.

The drone may be instructed by the control circuit to obtain data regarding specific areas around the dozer. For example, if a particular area of a construction site is of importance to the operator of the dozer, the drone may be commanded to obtain image and/or other data of the respective area. The drone may utilize the Global Positioning System (GPS) or other positioning data to travel to the commanded area. For example, the drone may be commanded to specific worksite coordinates, and the drone may utilize GPS or other positioning data to travel to the specific worksite coordinates to obtain the data. In other examples, the drone may be instructed to remain a specified distance from the dozer or at a fixed location with respect to the dozer. The drone may use one or more sensors or positioning systems to ensure a correct position with respect to the dozer when obtaining the data. This data can be used to provide the operator an enhanced view of the respective area, providing an improved experience for the operator of the dozer. By providing enhanced views to the operator of the dozer, the operator is able to more efficiently and confidently control the dozer.

The above detailed description is intended to be illustrative, and not restrictive. The scope of the disclosure should, therefore, be determined with references to the appended claims, along with the full scope of equivalents to which such claims are entitled.

What is claimed is:

1. An enhanced visibility system for a work machine, the enhanced visibility system comprising:
   an image capture device configured to obtain image data of an area surrounding the work machine;
   a sensor configured to obtain data regarding physical properties of the area surrounding the work machine, wherein the physical properties comprise one or more objects with a potential to obstruct the work machine;
   one or more control circuits configured to receive the image data and the data regarding the physical properties, wherein the one or more control circuits are configured to augment the image data with the data regarding the physical properties to generate augmented image data; and
   a display configured to display the augmented image data to provide an enhanced view of the area surrounding the work machine, wherein the enhanced view includes a directional indicator for a drive path of the work machine to avoid the one or more objects in the area surrounding the work machine, wherein the data regarding the physical properties is used to confirm or adjust the drive path and update the directional indicator.

2. The enhanced visibility system of claim 1, further comprising an aerial device configured to communicate with the one or more control circuits, wherein at least one of the image capture device or the sensor are positioned on the aerial device.

3. The enhanced visibility system of claim 2, wherein the sensor is positioned on the aerial device, and wherein the image capture device is positioned on the work machine.

4. The enhanced visibility system of claim 2, wherein the sensor is positioned on the work machine, and wherein the image capture device is positioned on the aerial device.

5. The enhanced visibility system of claim 2, wherein the image capture device is a first image capture device and is physically positioned on the work machine, and wherein the area surrounding the work machine is a first area surrounding the work machine, and wherein the enhanced visibility system further comprises:
   a second image capture device configured to obtain image data for a second area around the work machine different than the first area;
   wherein the one or more control circuits are configured to generate combined image data of the first and the second areas; and
   wherein the one or more control circuits are configured to augment the combined image data with the data regarding the physical properties to generate the augmented image data.

6. The enhanced visibility system of claim 5, wherein the first image capture device is positioned on the work machine, and wherein the second image capture device is positioned on the aerial device.

7. The enhanced visibility system of claim 6, wherein the work machine is a dozer, and wherein the augmented image data comprises one of a load profile of a dozer blade, a terrain map of the area surrounding the dozer, or a guidance indicator.

8. The enhanced visibility system of claim 2, wherein at least one of the image capture device or the sensor is static and positioned remote from the work machine and the aerial device.

9. The enhanced visibility system of claim 1, wherein the work machine is operated by an operator positioned physically on the work machine and the display is positioned on the work machine.

10. A method for providing an enhanced visibility display for an operator of a work machine, the method comprising:
    capturing, via an image capture device, image data of an area surrounding the work machine;
    sensing data regarding physical properties of the area surrounding the work machine, wherein the physical properties comprise one or more objects with a potential to obstruct the work machine;
    receiving, via one or more control circuits, the image data and the data regarding the physical properties;
    augmenting the image data with the data regarding the physical properties to generate augmented image data; and
    displaying the augmented image data to provide an enhanced view of the area surrounding the work machine to the operator, the enhanced view includes a directional indicator for a drive path of the work machine to avoid the one or more objects in the area surrounding the work machine, wherein the data regarding the physical properties is used to confirm or adjust the drive path and update the directional indicator.

11. The method of claim 10, wherein the image capture device is positioned on the work machine, and wherein sensing the data regarding the physical properties of the area surrounding the work machine comprises sensing the data via a sensor positioned on an aerial device.

12. The method of claim 10, wherein the image capture device is positioned on an aerial device, and wherein sensing the data regarding the physical properties of the area surrounding the work machine comprises sensing the data via a sensor positioned on the work machine.

13. The method of claim 10, wherein the image capture device is a first image capture device and is physically positioned on the work machine, and wherein the image data is first image data, and wherein the area surrounding the work machine is a first area surrounding the work machine, and wherein the method further comprises:
    capturing, via a second image capture device, second image data of a second area surrounding the work machine;
    combining the image data of the first and the second areas using the first and the second image data; and
    wherein augmenting the image data comprises augmenting the combined image data with the data regarding the physical properties to generate the augmented image data.

14. The method of claim 13, wherein the first image capture device is positioned on the work machine, and wherein the second image capture device is positioned on an aerial device.

15. A system for a remotely controlled work machine, the system comprising:

an image capture device configured to obtain image data of an area adjacent the remotely controlled work machine;

a sensor configured to obtain data regarding physical properties of the area adjacent the remotely controlled work machine, wherein the physical properties comprise one or more objects with a potential to obstruct the work machine;

a control circuit configured to receive the image data and the data regarding the physical properties, wherein the control circuit is configured to augment the image data with the data regarding the physical properties to generate augmented image data; and a display positioned on a remote computing device and configured to display the augmented image data to provide an enhanced view of the area adjacent the remotely controlled work machine to an operator of the remotely controlled work machine, wherein the enhanced view includes a directional indicator for a drive path of the work machine to avoid the one or more objects in the area surrounding the work machine, wherein the data regarding the physical properties is used to confirm or adjust the drive path and update the directional indicator and a load profile for the work machine including a predicted load profile based upon a predetermined route for the work machine following the directional indicator along the drive path.

16. The system of claim 15, further comprising an aerial device configured to communicate with the control circuit, wherein at least one of the image capture device or the sensor are positioned on the aerial device.

17. The system of claim 16, wherein the sensor is positioned on the aerial device, and wherein the image capture device is positioned on the remotely controlled work machine.

18. The system of claim 16, wherein the sensor is positioned on the remotely controlled work machine, and wherein the image capture device is positioned on the aerial device.

19. The system of claim 16, wherein the image capture device is a first image capture device and is physically positioned on the remotely controlled work machine, and wherein the area adjacent the remotely controlled work machine is a first area adjacent the remotely controlled work machine, and wherein the system further comprises:

a second image capture device configured to obtain image data for a second area adjacent the remotely controlled work machine different than the first area;

wherein the control circuit is configured to generate combined image data of the first and the second areas; and wherein the control circuit is configured to augment the combined image data with the data regarding the physical properties to generate the augmented image data.

20. The system of claim 19, wherein the first image capture device is positioned on the remotely controlled work machine, and wherein the second image capture device is positioned on the aerial device.

* * * * *